Aug. 2, 1927.
H. B. HULL
1,637,773
FAN BELT PULLEY
Filed May 19, 1926
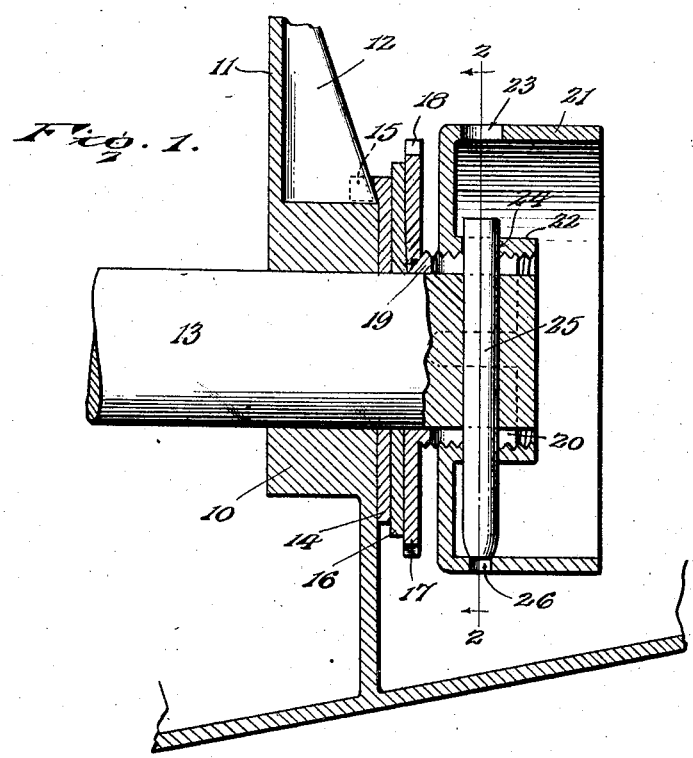
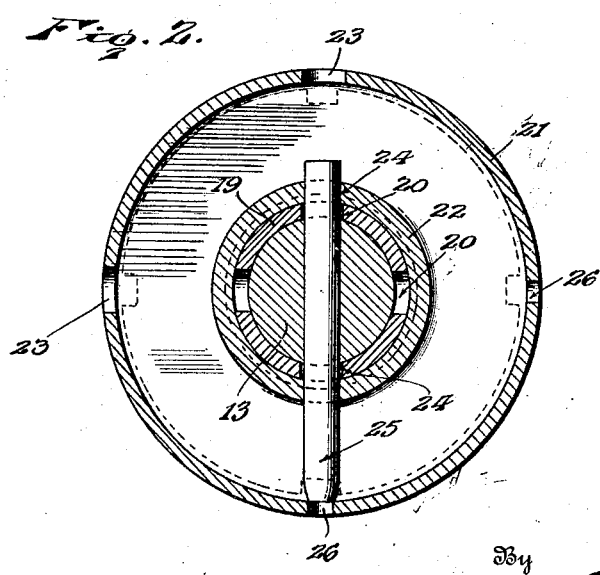
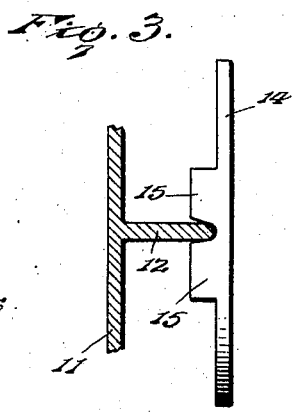
Inventor
H. B. Hull.
By Lacey & Lacey,
Attorneys Patented Aug. 2, 1927.

1,637,773

UNITED STATES PATENT OFFICE.

HARRY B. HULL, OF OILTON, OKLAHOMA, ASSIGNOR OF ONE-HALF TO CLYDE S. GOODALL, OF YALE, OKLAHOMA.

FAN-BELT PULLEY.

Application filed May 19, 1926. Serial No. 110,205.

This invention relates to an improved fan belt pulley for Ford engines, and seeks, among other objects, to provide a pulley which, after being applied to an engine crank shaft, may be adjusted for taking up end play in the crank shaft.

The invention seeks, as a further object, to provide a pulley wherein the pin employed for locking the pulley on the crank shaft will also serve to lock the parts in adjusted position.

And the invention seeks, as a still further object, to provide a pulley wherein suitable bearings will be provided for sustaining the rearward end thrust of the crank shaft.

Other objects of the invention not specifically mentioned in the foregoing will appear during the course of the following description.

In the accompanying drawings:

Figure 1 is a sectional view showing my improved pulley applied to the crank shaft of a Ford engine.

Figure 2 is a vertical sectional view on the line 2—2 of Figure 1, looking in the direction indicated by the arrows.

Figure 3 is a detail sectional view showing the manner in which the rearmost bearing washer employed is locked against rotation.

As is well known, the crank shaft of a Ford engine is subjected to unusual rearward end thrust, due to the fact that when the low speed clutch pedal of the vehicle transmission is pressed forwardly for rendering the low speed active, the pressure exerted on the lever is communicated to the crank shaft to pull rearwardly thereon. As a consequence, the rear main bearing of the crank shaft, which bearing, under normal circumstances, sustains the whole load of the rearward thrust of the crank shaft, soon becomes worn and as a result endwise play of the crank shaft develops. This endwise play is particularly objectionable for the reason that the magnets of the engine magneto are carried by the flywheel which, in turn, is connected with the engine crank shaft so that when the crank shaft shifts endwise the magnets are moved axially of the crank shaft away from the coil ring of the magneto to cause consequent faulty functioning of the magneto. The present invention, therefore, seeks to overcome these difficulties. In the drawings, I have shown the front bearing of a Ford engine at 10, a portion of this bearing being carried by the timing gear case cover 11 which is provided at its forward side with a rib 12 reinforcing the half of the bearing carried by said cover. Journaled through the bearing is the engine crank shaft, indicated at 13.

Coming now more particularly to the subject of the present invention, I employ a rear flat bearing washer 14 which is slipped over the forward end of the crank shaft to abut the bearing 10 lying flat thereagainst. The washer 14 is preferably formed of steel and is provided at a point in its periphery, as seen in Figure 3, with spaced laterally directed lugs 15 which straddle the reinforcing rib 12 of the timing gear case cover 11 for locking the washer against rotation. Slipped over the forward end of the crank shaft to lie flat against the bearing washer 14 is an intermediate flat bearing washer 16. This washer is preferably formed of bronze. However, it should be observed that, if desired, an anti-friction end thrust bearing may be employed in lieu of said washer.

Slipped over the forward end of the crank shaft to seat flat against the bearing washer 16 is a front flat bearing washer 17 which is preferably formed of steel. This washer is provided at its periphery with spaced notches 18 to accommodate a spanner wrench, and extending forwardly from the washer is a hub sleeve 19 freely fitting the crank shaft. As brought out in Figure 2, the sleeve is provided with pairs of diametrically disposed slots 20 which extend longitudinally of the sleeve throughout the major portion of its length and are open at the outer end of the sleeve. Adjustably mounted on the sleeve is a cylindrical pulley shell 21. This shell is provided centrally with a forwardly directed hub sleeve 22 and, as will now be observed, said sleeve is internally threaded to engage over the sleeve 19, which is externally threaded to receive the former sleeve. Formed in the peripheral wall of the shell are circumferentially spaced openings 23, and alining with each of said openings is a pair of diametrically disposed openings 24 in the sleeve 22. Each pair of the openings 24 is adapted to receive the usual belt pulley locking pin 25 as customarily employed upon Ford engines, the pin being removable, as will be understood, through either one or the other of the openings 23, depending upon the relative position of the pin, and formed in the peripheral wall of the shell, opposite each of the openings 23, is a smaller opening 26 to receive the tapered forward end of the pin. In accordance with standard practice, the crank shaft is, of course, apertured to accommodate the pin and, as will be observed, the pin is arranged to extend through one of the pairs of slots 20 in the hub sleeve 19 of the bearing washer 17 for locking the washer on the shaft. Either pair of the slots 20 is, of course, adapted to receive the pin. Thus, the pin not only functions to lock the washer 17 and shell 21 on the crank shaft but also serves to lock the shell in adjusted position on the hub sleeve 19 of said washer.

As will now be seen, when end play develops in the crank shaft 13, the locking pin 25 may be removed when, by holding the shell stationary and turning the washer 17 with a spanner wrench, said washer may be adjusted rearwardly on the shaft with respect to the shell. The same result may, of course, be obtained by holding the washer stationary and turning the shell so that as the locking pin 25 is replaced the shaft will be drawn forwardly and the end play therein taken up. The bearing washer 17 will then coact with the washer 16, which, in turn, will coact with the washer 14 for sustaining the rearward endwise thrust on the shaft and limiting the shaft against rearward movement. I accordingly provide a particularly efficient and effective construction for the purpose set forth and, as will be seen, the device may be readily installed without the necessity for any structural change in the engine.

Having thus described the invention, what I claim is:

1. The combination with an engine crank shaft, and a bearing journaling said shaft near its forward end and provided with a reinforcing rib, of a bearing washer freely surrounding the shaft to abut said bearing and provided with lugs straddling said rib for locking the washer against rotation, a pulley shell having a hub sleeve surrounding the shaft, a second bearing washer having a hub sleeve surrounding the shaft and adjustably engaged in said first mentioned sleeve whereby the latter washer may be adjustably positioned toward said first mentioned washer to operatively cooperate therewith for sustaining rearward endwise thrust on the crank shaft, and a locking pin extending through said sleeves and through the crank shaft to connect the shell with the crank shaft and lock the latter bearing washer in adjusted position.

2. The combination with an engine crank shaft, and a bearing journaling the shaft near its forward end, of a bearing washer freely surrounding the shaft to abut said bearing, means locking said washer in adjusted position, an intermediate bearing member abutting said washer, a pulley shell having a hub sleeve freely surrounding the shaft, a second bearing washer having a hub sleeve surrounding the shaft and screwed into the sleeve of said shell whereby the latter washer may be adjusted rearwardly to coact with said intermediate bearing member for sustaining rearward endwise thrust on the crank shaft, the sleeve of the shell being provided with alined openings and the sleeve of the latter bearing washer being provided with oppositely disposed slots, and a pin extending through said openings and said slots to connect the shell with the crank shaft and lock the latter bearing washer in adjusted position.

3. The combination with an engine crank shaft, and a bearing for the forward end portion thereof, of a bearing washer fitted upon said shaft against said bearing and held against rotation with the shaft, a second washer fitted upon said shaft and provided with a sleeve snugly fitting the shaft and extending towards its front end, the sleeve being formed with opposed longitudinally extending slots and said shaft having a diametrically extending passage communicating with the opposed slots of the sleeve, a pulley having a hub fitted upon said sleeve and adjustable longitudinally thereon, and a pin extending diametrically through the hub of said pulley and through the opposed slots of said sleeve and passage of said shaft.

In testimony whereof I affix my signature.

HARRY B. HULL. [L. S.]